United States Patent
Nakamura et al.

(10) Patent No.: US 9,688,154 B2
(45) Date of Patent: Jun. 27, 2017

(54) ELECTRICALLY POWERED VEHICLE AND METHOD OF CONTROLLING THE SAME

(75) Inventors: Makoto Nakamura, Okazaki (JP); Ryoji Sato, Toyohashi (JP); Takaya Soma, Anjo (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 244 days.

(21) Appl. No.: 13/581,749

(22) PCT Filed: Mar. 1, 2010

(86) PCT No.: PCT/JP2010/053195
§ 371 (c)(1),
(2), (4) Date: Aug. 29, 2012

(87) PCT Pub. No.: WO2011/108058
PCT Pub. Date: Sep. 9, 2011

(65) Prior Publication Data
US 2012/0323430 A1    Dec. 20, 2012

(51) Int. Cl.
*B60L 11/18* (2006.01)
*B60W 10/08* (2006.01)
*B60W 10/26* (2006.01)

(52) U.S. Cl.
CPC ....... *B60L 11/1803* (2013.01); *Y02T 10/7005* (2013.01); *Y02T 10/7258* (2013.01)

(58) Field of Classification Search
CPC ... B60L 11/1803; Y02T 10/70; Y02T 10/7005
(Continued)

(56) References Cited

U.S. PATENT DOCUMENTS

| 3,531,703 A | * | 9/1970 | Plumpe, Jr. | H02P 27/02 318/269 |
| 3,816,807 A | * | 6/1974 | Taylor | H02J 7/008 320/139 |

(Continued)

FOREIGN PATENT DOCUMENTS

| CN | 1974261 A | 6/2007 |
| DE | 10212751 A1 | 10/2003 |

(Continued)

OTHER PUBLICATIONS

International Search Report mailed May 18, 2010 of PCT/JP2010/053195.

*Primary Examiner* — Jerrah Edwards
*Assistant Examiner* — Charles J Han
(74) *Attorney, Agent, or Firm* — Andrews Kurth Kenyon LLP

(57) ABSTRACT

An electrically powered vehicle includes a motor generator configured to be capable of transmitting and receiving torque to and from a driving shaft coupled to a driving wheel; a DC power supply including a power storage device; and an inverter for performing bidirectional DC/AC power conversion between the DC power supply and the motor generator. The MG-ECU controls a plurality of power semiconductor switching elements to be turned on/off in accordance with a torque command value and a state value of the motor generator. When an accelerator pedal is released, the MG-ECU controls the inverter to superimpose a DC current component on an AC current of each phase in the motor generator in accordance with the state of charge of the power storage device.

12 Claims, 10 Drawing Sheets

(58) Field of Classification Search
USPC ....... 320/132, 137, 143, 145, 148, 155, 161,
320/162; 323/242, 288; 180/65.1, 65.2;
702/63; 307/10.7
See application file for complete search history.

(56) References Cited

U.S. PATENT DOCUMENTS

| | | | |
|---|---|---|---|
| 5,457,372 A * | 10/1995 | Pignatelli et al. | ............ 318/760 |
| 5,950,752 A | 9/1999 | Lyons | |
| 2003/0114269 A1 | 6/2003 | Grassl et al. | |
| 2004/0257011 A1 | 12/2004 | Rechberger | |
| 2007/0120520 A1* | 5/2007 | Miyazaki et al. | ............ 318/801 |
| 2008/0255716 A1* | 10/2008 | Bandai et al. | ................. 701/22 |
| 2010/0193267 A1 | 8/2010 | Nozawa | |

FOREIGN PATENT DOCUMENTS

| | | |
|---|---|---|
| DE | 69816235 T2 | 4/2004 |
| DE | 102005058829 A1 | 6/2007 |
| DE | 112008001911 B4 | 10/2012 |
| EP | 1301366 B1 | 9/2008 |
| JP | 2005-168140 A | 6/2005 |
| JP | 2006-033969 A | 2/2006 |
| JP | 2009-112150 A | 5/2009 |
| JP | 2009-131077 A | 6/2009 |
| JP | 2009-219189 A | 9/2009 |

* cited by examiner

ELECTRICALLY POWERED VEHICLE AND METHOD OF CONTROLLING THE SAME

This is a 371 national phase application of PCT/JP2010/053195 filed 1 Mar. 2010, the contents of which are incorporated herein by reference.

TECHNICAL FIELD

The present invention relates to an electrically powered vehicle and a method of controlling the same, and particularly to electric motor control during release of an accelerator pedal of an electrically powered vehicle equipped with a traction motor.

BACKGROUND ART

In recent years, attention has been given to an electrically powered vehicle as an environmentally-friendly vehicle, such as a hybrid vehicle, an electric vehicle and a fuel cell vehicle. Such an electrically powered vehicle includes a power storage device formed of a secondary battery and the like, and a motor generator as a traction motor capable of receiving electric power from this electrically powered vehicle to generate driving force. The motor generator generates vehicle driving force at the time of acceleration while carrying out regenerative power generation for converting the kinetic energy of the vehicle into electrical energy at the time of deceleration such as braking. In the electrically powered vehicle, the regenerative power from the motor generator is collected by charging of the power storage device, thereby improving energy efficiency.

On the other hand, excessive regenerative power from the motor generator may cause a problem concerning component protection, such as occurrence of an overvoltage and overcharge of the power storage device. Therefore, control is required to prevent excessive generation of regenerative power from the motor generator.

For example, Japanese Patent Laying-Open No. 2009-219189 (PTL 1) discloses a four-wheel drive vehicle capable of driving the engine by one of front and rear wheels and driving the motor by the other thereof. This four-wheel drive vehicle has a configuration for suppressing and preventing damage to an inverter switching element caused by an overvoltage, when the alternating-current (AC) voltage of the power generator driven by the engine is rectified, converted by the inverter and then applied to the motor.

Specifically, PTL 1 discloses that, when the rollback state of the electric motor for driving a vehicle is detected, the target armature current is set so as to cause flow of the d-axis current not contributing to torque generation, thereby consuming the electric power generated by regeneration of the traction motor. This allows suppression of an increase in the direct-current (DC) link voltage of the inverter that is caused by excessive regenerative power from the traction motor. Consequently, damage to the switching element forming an inverter can be prevented.

CITATION LIST

Patent Literature

PTL 1: Japanese Patent Laying-Open No. 2009-219189

SUMMARY OF INVENTION

Technical Problem

In the situation where the electrically powered vehicle is driven by the output of the motor generator, the motor generator needs to generate deceleration torque in order to implement the deceleration equivalent to the so-called engine braking while the accelerator pedal is released. However, generation of deceleration torque by the motor generator involves regenerative power generation. Accordingly, when charging of the power storage device is inhibited/limited, attention should be paid to prevent occurrence of overcharge of the power storage device.

For example, according to the technique disclosed in PTL 1, since power consumption of the motor generator can be increased by increasing the d-axis current, it is expected that the regenerative power from the motor generator can be suppressed while generating deceleration torque.

However, as generally known, according to electric motor control (vector control) based on d-q axis conversion, in order to generate a d-axis current that is a DC component, the AC voltage applied to the motor generator is controlled by three-phase to two-phase conversion using the rotor rotation angle of the motor generator. Thus, when an error occurs in the rotation angle sensor, this error may prevent generation of the intended d-axis current or may cause unintentional deceleration torque, thereby causing excessive generation of regenerative power from the motor generator.

Furthermore, in the case where charging of the power storage device is inhibited, control is required to prevent generation of the regenerative power from the motor generator. In this case, it is necessary to control the AC voltage applied to the motor generator to generate, in the stator, a rotating magnetic field so as to cause the output torque of the motor generator to be zero. However, when an error occurs in the rotation angle sensor, deceleration torque occurs due to control errors, which may cause generation of regenerative power.

As described above, it is understood that the electrically powered vehicle requires the traction motor (motor generator) to be carefully controlled during release of the accelerator pedal in the state where charging of the power storage device is inhibited or limited.

The present invention has been made to solve the above-described problems, and aims to provide an electrically powered vehicle equipped with a traction motor (motor generator), for appropriately controlling the traction motor (motor generator) during release of an accelerator pedal so as to prevent overcharge of the power storage device.

Solution to Problem

According to an aspect of the present invention, an electrically powered vehicle includes a motor generator, a DC power supply including a power storage device, and a motor control unit. The motor generator is configured to be capable of transmitting and receiving torque to and from a driving shaft coupled to a driving wheel. An inverter is configured to perform bidirectional DC/AC power conversion between the DC power supply and the motor generator. The motor control unit is configured to control a plurality of power semiconductor switching elements forming the inverter in accordance with a torque command value and a state value of the motor generator. The motor control unit includes a DC offset generation unit for controlling the inverter to superimpose a DC current component on an AC current of each phase in the motor generator in accordance with a state of charge of the power storage device, during release of an accelerator pedal.

Preferably, the electrically powered vehicle further includes a charge/discharge monitoring unit and a vehicle control unit. The charge/discharge monitoring unit is configured to set a charge power upper limit value of the power storage device based on the state of charge of the power storage device. The vehicle control unit is configured to set the torque command value based on a vehicle state and the charge power upper limit value set by the charge/discharge monitoring unit. The vehicle control unit includes a determination unit. The determination unit is configured to determine whether or not a first power exceeds the charge power upper limit value. This first power is equivalent to regenerative power caused by the motor generator outputting deceleration torque required for ensuring prescribed deceleration during release of the accelerator pedal. When it is determined that the first power exceeds the charge power upper limit value during release of the accelerator pedal, the DC offset generation unit controls the inverter to superimpose the DC current component on the AC current of each phase.

Further preferably, the vehicle control unit further includes a torque command value setting unit for limiting the regenerative power by the motor generator so as to fall within a range not exceeding the charge power upper limit value, to set the torque command value. The DC offset generation unit and the torque command value setting unit set a current amount of the DC current component and the torque command value, respectively, so as to ensure required deceleration torque by a sum of dragging torque caused by the DC current component and the torque command value, during release of the accelerator pedal while charging is limited during which the first power exceeds the charge power upper limit value.

Further preferably, the torque command value setting unit sets the torque command value at zero when charging is inhibited during which the charge power upper limit value is set at zero. The DC offset generation unit sets the current amount of the DC current component at a prescribed value when charging is inhibited.

Preferably, the electrically powered vehicle further includes a charge/discharge monitoring unit and a vehicle control unit. The charge/discharge monitoring unit is configured to set a charge power upper limit value of the power storage device based on the state of charge of the power storage device. The vehicle control unit is configured to set the torque command value based on a vehicle state and the charge power upper limit value. The vehicle control unit sets the torque command value at zero when charging is inhibited during which the charge power upper limit value is set at zero. The DC offset generation unit sets a current amount of the DC current component at a prescribed value when charging is inhibited.

Further preferably, the motor control unit includes a control command generation unit, an addition unit, a carrier wave control unit, and a modulation unit. Based on the torque command value and the state value, the control command generation unit is configured to generate a voltage command value of a voltage applied to the motor generator. The addition unit is configured to add an offset voltage in accordance with the DC current component to the voltage command value when the DC current component is superimposed by the DC offset generation unit. The carrier wave control unit controls a frequency of a carrier wave. The modulation unit is configured to generate an on/off control signal of each of the plurality of power semiconductor switching elements based on comparison between the voltage command value processed by the addition unit and the carrier wave. When the DC current component is superimposed, the carrier wave control unit increases the frequency of the carrier wave as compared with a case where the DC current component is not superimposed.

Further preferably, the motor control unit further includes a demagnetizing factor estimation unit for estimating a demagnetizing factor of the motor generator. The DC offset generation unit limits a time period during which the DC current component is superimposed on the AC current of each phase in accordance with an estimate value of the demagnetizing factor. Alternatively, the DC offset generation unit variably sets a current amount of the DC current component superimposed on the AC current of each phase in accordance with an estimate value of the demagnetizing factor.

According to another aspect of the present invention, a method of controlling an electrically powered vehicle is provided. The electrically powered vehicle includes a motor generator configured to be capable of transmitting and receiving torque to and from a driving shaft coupled to a driving wheel, a DC power supply including a power storage device, and an inverter for performing bidirectional DC/AC power conversion between the DC power supply and the motor generator. The controlling method includes the steps of: detecting that an accelerator pedal is released; and, during release of the accelerator pedal, controlling the inverter to superimpose a DC current component on an AC current of each phase in the motor generator in accordance with a state of charge of the power storage device.

Preferably, the controlling method includes the steps of: calculating a first power equivalent to regenerative power caused by the motor generator outputting deceleration torque required for ensuring prescribed deceleration during release of the accelerator pedal; and comparing the first power with a charge power upper limit value set based on the state of charge of the power storage device. The controlling step superimposes the DC current component on the AC current of each phase when the first power exceeds the charge power upper limit value.

Further preferably, the controlling method further includes the step of: during release of the accelerator pedal while charging is limited during which the first power exceeds the charge power upper limit value, limiting the regenerative power by the motor generator so as to fall within a range not exceeding the charge power upper limit value, to set a torque command value of the motor generator, and setting a current amount of the DC current component so as to ensure required deceleration torque by a sum of dragging torque caused by the DC current component and the torque command value.

Alternatively, further preferably, the controlling method further includes the steps of, when the first power exceeds the charge power upper limit value, determining whether or not charging is inhibited during which the charge power upper limit value is set at zero; when charging is inhibited, setting a torque command value of the motor generator at zero and setting a current amount of the DC current component at a prescribed value; and, when the charge power upper limit value is not zero, limiting the regenerative power by the motor generator so as to fall within a range not exceeding the charge power upper limit value, to set the torque command value, and setting the current amount of the DC current component so as to ensure required deceleration torque by a sum of dragging torque caused by the DC current component and the torque command value.

Preferably, the controlling method further includes the step of setting a torque command value of the motor generator at zero and setting a current amount of the DC current component at a prescribed value during release of the accelerator pedal while charging is inhibited during which a charge power upper limit value of the power storage device is set at zero.

Further preferably, a plurality of power semiconductor switching elements forming the inverter are controlled to be turned on/off in accordance with comparison between a voltage command value of a voltage applied to the motor generator and a carrier wave. When the DC current component is superimposed in the controlling step, an offset voltage in accordance with the DC current component is added to the voltage command value. The controlling method further includes the steps of: determining whether or not the DC current component is superimposed in the controlling step; setting a frequency of the carrier wave at a first frequency when the DC current component is not superimposed; and setting the frequency of the carrier wave at a second frequency higher than the first frequency when the DC current component is superimposed.

Alternatively preferably, the controlling method further includes the steps of: estimating a demagnetizing factor of the motor generator; and limiting a time period during which the DC current component is superimposed on the AC current of each phase, in accordance with an estimate value of the demagnetizing factor. Alternatively, the controlling method further includes the steps: of estimating a demagnetizing factor of the motor generator; and variably setting a magnitude of the DC current component superimposed on the AC current of each phase in accordance with an estimate value of the demagnetizing factor.

Advantageous Effects of Invention

According to the present invention, in the electrically powered vehicle equipped with a traction motor (motor generator), the traction motor (motor generator) can be appropriately controlled during release of an accelerator pedal so as to prevent overcharge of the power storage device.

DESCRIPTION OF EMBODIMENTS

Figure 1:
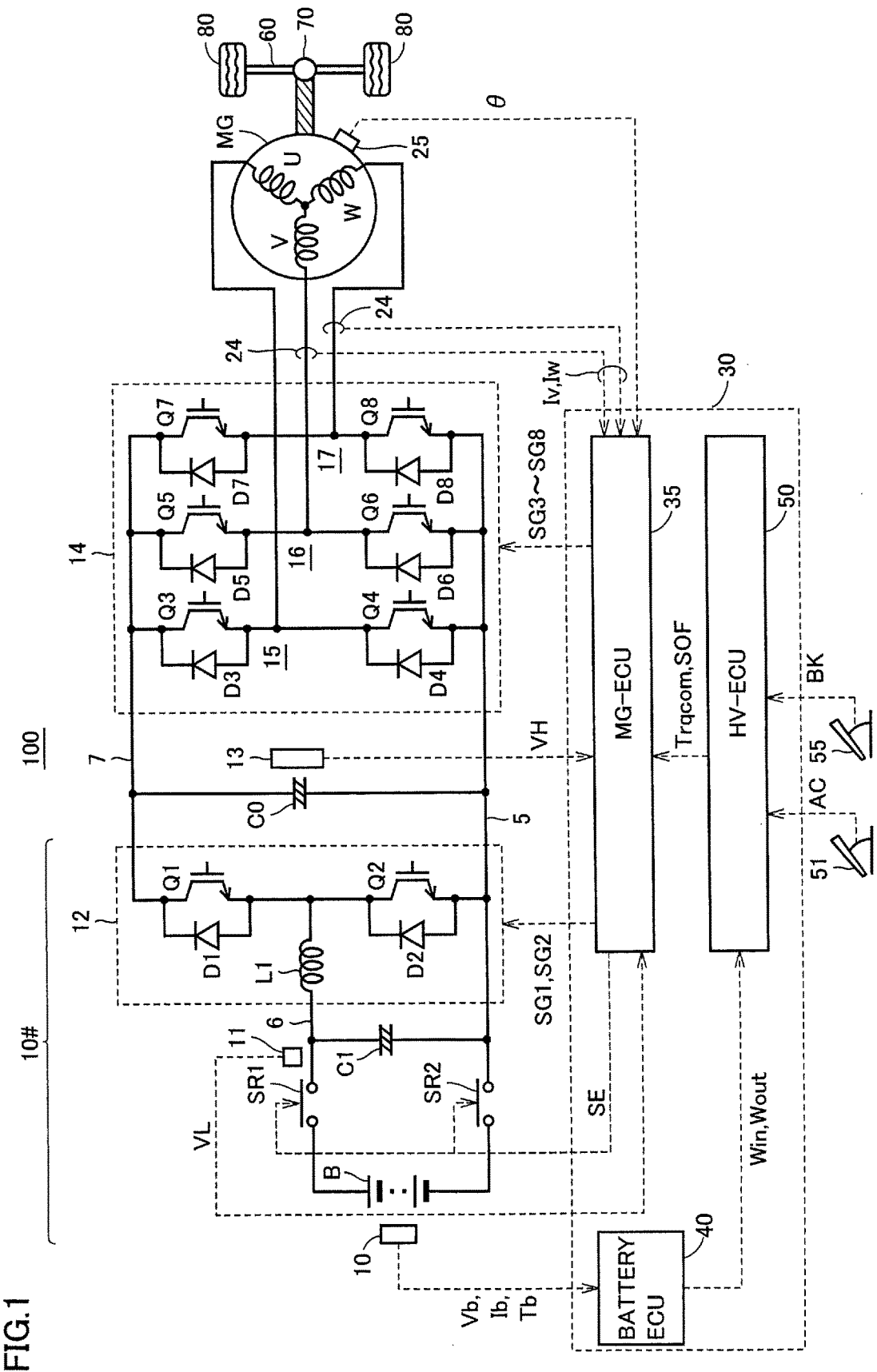
FIG. 1 is a block diagram illustrating the schematic configuration of an electrically powered vehicle according to the first embodiment of the present invention.

The embodiments of the present invention will be hereinafter described in detail with reference to the accompanying drawings, in which the same or corresponding components are designated by the same reference characters, and description thereof will not be repeated.

[First Embodiment]

FIG. 1 is a block diagram illustrating the schematic configuration of an electrically powered vehicle 100 according to the first embodiment of the present invention. Electrically powered vehicle 100 comprehensively refers to an automobile such as a hybrid vehicle, an electric vehicle and a fuel-cell vehicle, which generates vehicle driving force by electrical energy. Specifically, electrically powered vehicle 100 includes a motor generator MG configured to generate at least vehicle driving force as a driving force source. In the case where electrically powered vehicle 100 is a hybrid vehicle, an engine that is not shown is further mounted as a driving force source in addition to motor generator MG.

Referring to FIG. 1, electrically powered vehicle 100 includes a DC power supply unit 10#, a smoothing capacitor C0, an inverter 14, a motor generator MG, a control device 30, an accelerator pedal 51, a brake pedal 55, a driving shaft 60, a differential gear 70, and a driving wheel 80.

DC power supply unit 10# includes a power storage device B, system relays SR1 and SR2, a smoothing capacitor C1, and a converter 12.

Power storage device B is representatively formed by a secondary battery such as a nickel-metal hydride battery or a lithium ion battery, and thus, will be hereinafter also referred to as a battery B. It is confirmatively described that "power storage device" is applicable not only to a battery but also to an electric double layer capacitor or the like.

A monitoring unit 10 including a sensor group is disposed for battery B. Monitoring unit 10 is configured to detect an output voltage Vb, an output current Ib and a temperature Tb of the power storage device and to monitor whether or not abnormal values thereof occur. In addition, output current Ib is represented as a positive value (Ib>0) during discharge of power storage device B and as a negative value (Ib<0) during charge of power storage device B. The detection value by monitoring unit 10 is output to control device 30.

System relay SR1 is connected between the positive electrode terminal of battery B and a power line 6 while system relay SR1 is connected between the negative electrode terminal of battery B and a ground line 5. System relays SR1 and SR2 are turned on/off by control signal SE.

Smoothing capacitor C1 is connected between power line 6 and ground line 5. A voltage sensor 11 detects the voltage across smoothing capacitor C1, that is, a DC voltage VL on power line 6, and outputs the detection value to control device 30.

Converter 12 includes a reactor L1, and power semiconductor switching elements Q1 and Q2. Power semiconductor switching elements Q1 and Q2 are connected in series between power line 7 and ground line 5. Power semiconductor switching elements Q1 and Q2 are controlled to be turned on/off by switching control signals SG1 and SG2.

In the embodiment of the present invention, the power semiconductor switching element (which will be hereinafter simply referred to as a "switching element") used herein may be an IGBT (Insulated Gate Bipolar Transistor), a power MOS (Metal Oxide Semiconductor) transistor, a power bipolar transistor or the like. Antiparallel diodes D1 and D2 are disposed for switching elements Q1 and Q2, respectively. Reactor L1 is connected between power line 6 and the connection node of switching elements Q1 and Q2.

Smoothing capacitor C0 is connected between power line 7 and ground line 5. A voltage sensor 13 detects the voltage across smoothing capacitor C0, that is, a DC voltage VH on power line 7, and outputs the detection value to control device 30. DC voltage VH equivalent to the voltage on the DC side in inverter 14 will be hereinafter also referred to as a system voltage VH.

In accordance with on/off control of switching element Q1 and/or Q2, converter 12 performs bidirectional DC voltage conversion between DC voltages VL and VH. The voltage conversion ratio (VH/VL) by converter 12 is controlled in accordance with the duty ratios of switching elements Q1 and Q2. Specifically, a voltage command value VHr is set in accordance with the state of motor generator MG while the duty ratio in converter 12 is controlled based on the detection values of DC voltages VH and VL. When it is not necessary to raise DC voltage VH from DC voltage VL, switching elements Q1 and Q2 are fixed to be turned on and off, respectively, which can lead to VH=VL (voltage conversion ratio=1.0).

In converter 12, switching elements Q1 and Q2 are basically controlled so as to be complementarily and alternately turned on and off within each switching cycle. In this way, DC voltage VH can be controlled to be set at a voltage command value VHr without particularly having to switch the control operation in accordance with the current direction in converter 12 and in response to both of charge and discharge of battery B.

Inverter 14 is formed of an U-phase upper and lower arm 15, a V-phase upper and lower arm 16 and a W-phase upper and lower arm 17 which are provided in parallel between power line 7 and ground line 5. The upper and lower arm of each phase is formed of switching elements connected in series between power line 7 and ground line 5. For example, U-phase upper and lower arm 15 is formed of switching elements Q3 and Q4, V-phase upper and lower arm 16 is formed of switching elements Q5 and Q6, and W-phase upper and lower arm 17 is formed of switching elements Q7 and Q8. Furthermore, antiparallel diodes D3 to D8 are connected to switching elements Q3 to Q8, respectively. Switching elements Q3 to Q8 are controlled to be turned on and off by switching control signals SG3 to SG8 from control device 30.

Motor generator MG is representatively formed of a three-phase permanent-magnet type synchronous motor, in which three coils of the U-, V- and W-phases wound around a stator (not shown) each have one end connected in common to a neutral point. Furthermore, the other end of each phase coil is connected to the intermediate point of the switching element of a corresponding one of these phase upper and lower arms 15 to 17.

Motor generator MG generates driving force in accordance with the three-phase AC power supplied from inverter 14, to rotationally drive driving wheel 80 via driving shaft 60 and differential gear 70 which are mechanically coupled. In other words, motor generator MG is configured to be capable of transmitting and receiving torque to and from driving shaft 60 coupled to driving wheel 80.

In the case where electrically powered vehicle 100 is a hybrid vehicles further equipped with an engine that is not shown, in order to allow driving wheel 80 to be rotationally driven by the output from this engine that is not shown, electrically powered vehicle 100 may be configured such that the power split device and the like using a planetary gear mechanism and the like is interposed on the driving-force transmission path extending from motor generator MG, to allow appropriate distribution of the driving force generated by motor generator MG and the engine.

A current sensor 24 detects the current (phase current) flowing through motor generator MG, and outputs the detection value to control device 30. In addition, since the sum of instantaneous values of three-phase currents Iu, Iv and Iw is equal to zero, current sensor 24 may be disposed so as to detect motor currents of two phases (for example, a V-phase current Iv and a W-phase current Iw) as shown in FIG. 1.

A rotation angle sensor (resolver) 25 detects a rotor rotation angle $\theta$ of motor generator MG, and transmits this detected rotation angle $\theta$ to control device 30. Control device 30 can calculate the rotation speed and a rotational frequency we of motor generator MG based on rotation angle $\theta$. In addition, if rotation angle $\theta$ is directly calculated by control device 30 based on the motor voltage and current, rotation angle sensor 25 may be eliminated.

Control device 30 is configured by a single or a plurality of electronic control unit(s) (ECU). The ECU executes a prescribed control operation by software processing by the CPU (Central Processing Unit) that is not shown executing the program stored in advance and/or by hardware processing by a dedicated electronic circuit.

In the configuration example in FIG. 1, control device 30 is configured to include an MG-ECU 35, a battery ECU 40 and an HV-ECU 50. However, it is also possible to provide an ECU incorporating a part or all of functions of these ECUs.

Battery ECU 40 estimates the present state of charge (SOC) of battery B (power storage device) based on the state value (output voltage Vb, output current Ib and temperature Tb) of battery B (power storage device) that is detected by monitoring unit 10. The SOC is generally represented as a ratio of the present charging amount to the fully-charged state (100%) in percentage.

Furthermore, in order to control charge and discharge of battery B, battery ECU 40 sets a charge power upper limit value Win and a discharge power upper limit value Wout of battery B at least based on the SOC. As for the input and output power of battery B, the discharge power is represented by a positive value while the charge power is represented by a negative value, with the result that Win≤0 and Wout≥0. Battery ECU 40 corresponds to a "charge/discharge monitoring unit".

HV-ECU 50 controls running of electrically powered vehicle 100 based on an operation amount AC of accelerator pedal 51, an operation amount BK of brake pedal 55, and the information showing the vehicle state from the sensor that is not shown. For example, HV-ECU 50 controls running of electrically powered vehicle 100 so as to implement the acceleration or deceleration desired by the user in accordance with the user's accelerator pedal operation (AC) and brake operation (BK). HV-ECU 50 corresponds to a "vehicle control unit".

As part of this running control, a torque command value Trqcom of motor generator MG for vehicle running is set. At the time of acceleration of electrically powered vehicle 100, the torque command value of motor generator MG is set to be positive (Trqcom>0).

When brake pedal 55 is operated, HV-ECU 50 calculates the total braking force required for the entire vehicle based on brake operation amount BK and the vehicle speed detected by the vehicle speed sensor that is not shown, and also performs cooperative control for distributing this total braking force to the hydraulic braking force by a hydraulic brake (not shown) and the regenerative braking force by motor generator MG. In this case, the torque command value (Trqcom<0) for generating regenerative braking force by motor generator MG is set such that the power generated by motor generator MG outputting the deceleration torque equivalent to the torque command value falls within the range of charge power upper limit value Win. In addition, even when the regenerative braking force by motor generator MG is limited, the total braking force can always be ensured by ensuring the braking force by the hydraulic brake.

Furthermore, in the conventional vehicle utilizing an internal combustion engine as a driving source, the deceleration equivalent to the so-called engine braking is automatically generated during release of the accelerator pedal. Therefore, during release of accelerator pedal 51, torque command value Trqcom is set at a prescribed value (negative value) in order to allow HV-ECU 50 to ensure prescribed deceleration equivalent to the above-described engine braking.

It is to be noted that torque command value Trqcom is always set in the state where the power consumption obtained by output of torque by the motor generator or the charge/discharge power of battery B associated with the generated power is limited to fall within the range of Win to Wout.

Based on torque command value Trqcom by HV-ECU 50, MG-ECU 35 controls inverter 14 and converter 12 such that motor generator MG operates. MG-ECU 35 receives inputs of torque command value Trqcom, DC voltage VL detected by voltage sensor 11, system voltage VH detected by voltage sensor 13, motor currents Iv and Iw detected by current sensor 24, and rotation angle θ from rotation angle sensor 25. Based on these input signals, MG-ECU 35 generates switching control signals SG1 and SG2 for controlling DC voltage conversion by converter 12, and switching control signals SG3 to SG8 for controlling DC/AC voltage conversion by inverter 14. In other words, MG-ECU 35 corresponds to a "motor control unit".

At the time of acceleration of electrically powered vehicle 100, switching control signals SG3 to SG8 are generated such that inverter 14 is controlled in accordance with the positive torque command value (Trqcom>0). Consequently, the AC voltage for generating a rotating magnetic field for causing positive torque in the stator of motor generator. MG is applied from inverter 14 to motor generator MG. This allows motor generator MG to generate the driving force for accelerating electrically powered vehicle 100 based on the DC power on power line 7 from battery B.

At the time of deceleration of electrically powered vehicle 100, motor generator MG is driven by the rotating force of driving wheel 80, thereby operating as a power generator. The term "at the time of deceleration" referred herein means the time when acceleration is stopped by releasing accelerator pedal 51 though brake pedal 55 is not operated, in addition to the time of braking involving regenerative power generation in the case where brake pedal 55 is operated.

Basically, torque command value Trqcom of motor generator MG is set to be negative (Trqcom<0) at the time of deceleration of electrically powered vehicle 100. Then, inverter 14 converts the power generated by motor generator MG by output of the negative torque into DC power, and then, outputs the power to power line 7. This regenerated DC power is supplied into battery B via smoothing capacitor C0 and converter 12.

Furthermore, in the case where torque command value Trqcom=0, switching control signals SG3 to SG8 are generated such that inverter 14 outputs the AC voltage for generating, in the stator, a rotating magnetic field so as to cause the output torque of motor generator MG to be set at zero.

As described above, charging of battery B is limited or inhibited when the SOC increases during which overcharge of battery B may occur. In this case, the absolute value of charge power upper limit value Win (set such that Win<0) is reduced. When charging is inhibited, Win=0. When charging of battery B is limited or inhibited, it is necessary to suppress the regenerative power by motor generator MG in order to prevent overcharge of battery B while accelerator pedal 51 is released (which will be hereinafter simply referred to as "during release of accelerator pedal").

Figure 2:
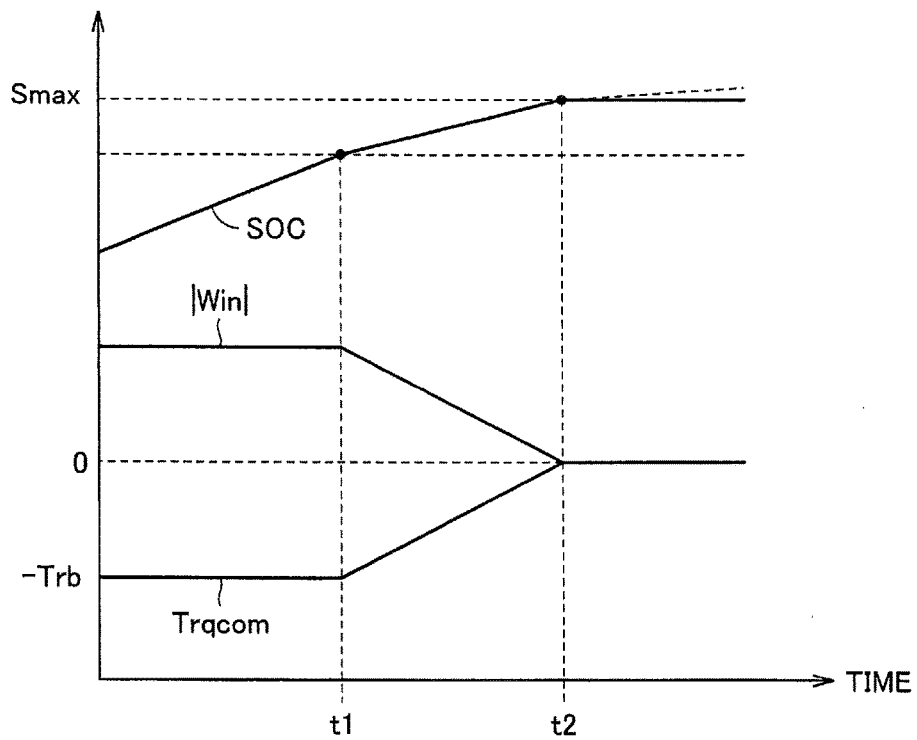
FIG. 2 is a graph showing an example of the setting manner of a torque command value for preventing overcharge of a battery during release of an accelerator pedal of the electrically powered vehicle.

FIG. 2 shows an example of the setting manner of the torque command value for preventing overcharge of the battery during release of the accelerator pedal of electrically powered vehicle 100. It is assumed in FIG. 2 that the vehicle continuously runs on a downhill road for a long distance.

Referring to FIG. 2, torque value −Trb corresponds to deceleration torque for ensuring the deceleration equivalent to engine braking. It is to be noted that this deceleration torque −Trb is not necessarily a constant value, but may be set at a variable value depending on the vehicle conditions (a vehicle speed, a road surface gradient, and the like).

For the time period until time t1, a charge power upper limit value |Win| is greater than the power generated by motor generator MG at the time of occurrence of deceleration torque −Trb, which shows that setting can be made such that torque command value Trqcom=−Trb. During this time period, the SOC gradually increases by the regenerative power from motor generator MG caused by occurrence of deceleration torque.

Then, at time t1, charge power upper limit value |Win| is suppressed in accordance with an increase in the SOC, thereby leading to torque command value Trqcom>−Trb which can be set, with the result that occurrence of deceleration torque is limited. In other words, charging of battery B during release of the accelerator pedal is limited.

At time t1 or later, torque command value Trqcom is set to fall within the range of charge power upper limit value |Win|. Accordingly, the deceleration torque by motor generator MG is decreased while the increasing rate of the SOC becomes relatively slow.

Then, when the limited deceleration torque is further continuously generated, at time t2, the SOC increases to a control upper limit value Smax at which charging of battery B is inhibited. This leads to the setting such that charge power upper limit value Win=0. In this case, regenerative power generation by motor generator MG is inhibited, which leads to the setting such that torque command value Trqcom=0.

As described above, in the case where torque command value Trqcom=0, inverter 14 is controlled to generate a rotating magnetic field so as to cause the output torque of motor generator MG to be set at zero. However, when errors and the like of rotation angle sensor 25 cause unintentional regenerative power to be generated from motor generator MG, the SOC may increase also at time t2 or later as shown by the dotted lines in FIG. 2, which may lead to overcharge of battery B.

Furthermore, in the situation where charging of battery B is limited or inhibited, as disclosed in PTL 1, the d-axis current is positively flown, so that the regenerative power from motor generator MG can be suppressed and the SOC can also be decreased. Also in this case, however, unintentional regenerative power generation may occur due to control errors resulting from errors and the like of rotation angle sensor 25.

Therefore, in electrically powered vehicle 100 according to the present embodiment, deceleration control during release of the accelerator pedal is performed as set forth below.

Figure 3:
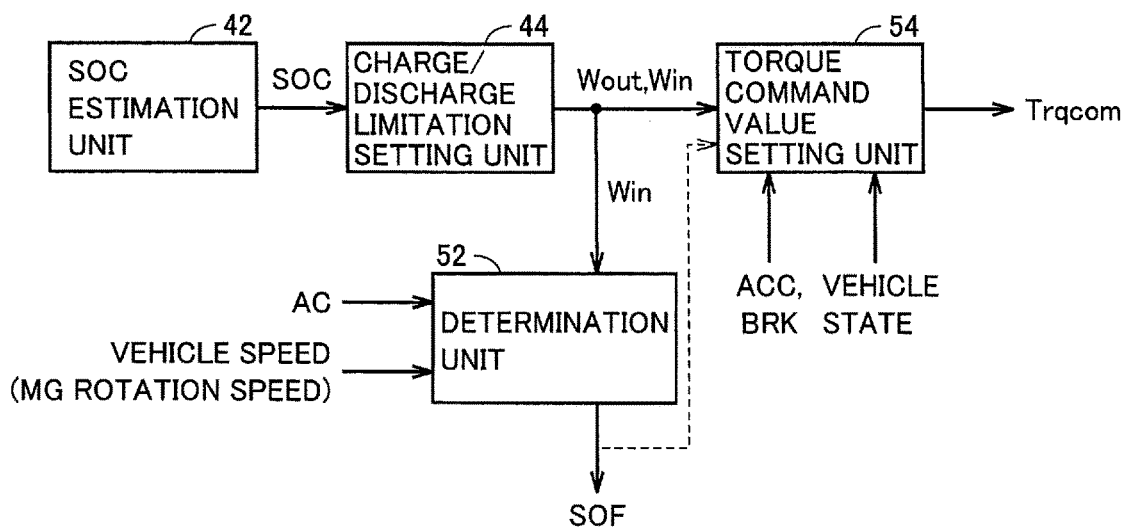
FIG. 3 is a block diagram for illustrating deceleration control during release of the accelerator pedal of the electrically powered vehicle according to the first embodiment of the present invention.

FIG. 3 is a block diagram for illustrating the deceleration control during release of the accelerator pedal of the electrically powered vehicle according to the embodiment of the present invention.

Each functional block shown in each of block diagrams including FIG. 3 may be implemented by configuring an electronic circuit (hardware) having a function corresponding to each block within the ECU or implemented by the ECU executing software processing in accordance with the program set in advance.

Referring to FIG. 3, an SOC estimation unit 42 estimates the SOC of battery B based on the state value (voltage, current, temperature, and the like) of battery B (power storage device) detected by monitoring unit 10. Simply speaking, there is a known method of estimating an SOC based on the integrated value, the open circuit voltage and/or the like of battery current Ib.

A charge/discharge limitation setting unit 44 sets charge power upper limit value Win and discharge power upper limit value Wout in accordance with the SOC estimated by SOC estimation unit 42. In addition, in consideration of battery temperature Tb, Win and Wout may be set such that charge and discharge are limited more at a relatively high or low temperature causing an increase in the internal resistance of battery B than at the normal temperature.

In the configuration in FIG. 1, SOC estimation unit 42 and charge/discharge limitation setting unit 44 correspond to functional blocks implemented by battery ECU 40.

A torque command value setting unit 54 sets torque command value Trqcom in accordance with accelerator pedal operation amount AC, brake operation amount BK and the vehicle state of electrically powered vehicle 100 so as to implement the acceleration or deceleration desired by the user. However, as described above, torque command value Trqcom is set such that the generated power or power consumption occurring when motor generator MG outputs the torque equivalent to Trqcom falls within the range of Win to Wout.

A determination unit 52 receives accelerator pedal operation amount AC, the vehicle speed of electrically powered vehicle 100 (or the rotation speed of motor generator MG) and charge power upper limit value Win. Then, during release of the accelerator pedal, determination unit 52 estimates deceleration torque −Trb required for achieving the prescribed deceleration equivalent to engine braking, and regenerative power Wrb# caused by motor generator MG outputting this deceleration torque −Trb.

Furthermore, determination unit 52 compares estimated regenerative power Wrb# with charge power upper limit value Win. Then, when regenerative power Wrb# falls within the range of charge power upper limit value Win (that is, |Wrb#|≤|Win|), a determination flag SOF is turned off. When regenerative power Wrb# exceeds charge power upper limit value Win (that is, |Wrb#|>|Win|), determination flag SOF is turned on.

In this way, determination unit 52 sets determination flag SOF in accordance with the state of charge of battery B during release of the accelerator pedal. Determination flag SOF shows whether or not limitation on/inhibition of charge/discharge of battery B prevents the prescribed deceleration (equivalent to engine braking) from being ensured during release of the accelerator pedal within the range of the present charge power upper limit value Win. It is to be noted that determination flag SOF may be further reflected in setting of torque command value Trqcom in torque command value setting unit 54.

Determination unit 52 and torque command value setting unit 54 correspond to functional blocks implemented by HV-ECU 50 in the configuration in FIG. 1.

Figure 4:
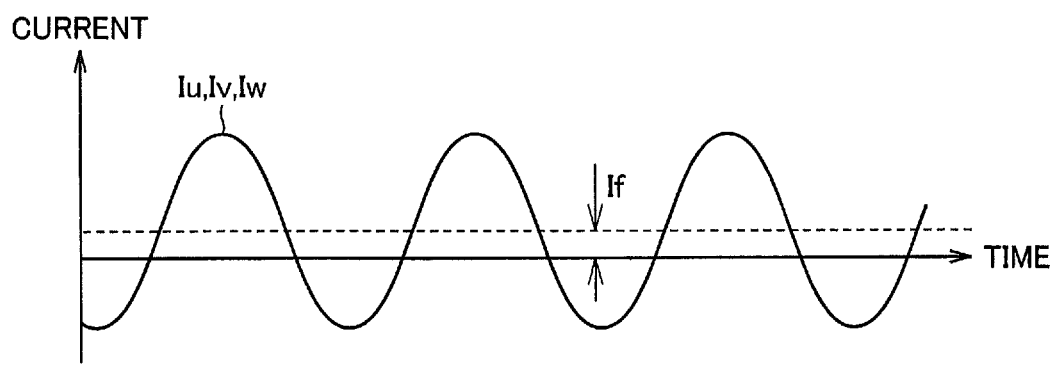
FIG. 4 is a waveform diagram illustrating superimposition of a DC current on a current of each phase in a motor generator.

When determination flag SOF is turned on, inverter 14 is controlled to superimpose a DC current on the AC current of each phase in motor generator MG as shown in FIG. 4.

Referring to FIG. 4, currents Iu, Iv and Iw of each phase in motor generator MG are generated in accordance with the AC voltage output by inverter 14. Inverter 14 controls the phase and/or the amplitude of the output voltage such that the output torque of motor generator MG conforms to torque command value Trqcom. In this case, according to the conventional electric motor control, inverter 14 is generally controlled such that an offset is prevented as much as possible for each phase current of motor generator MG.

On the other hand, in electrically powered vehicle 100 according to the present embodiment, when determination flag SOF is turned on, a DC component is superimposed on each phase current of motor generator MG, thereby intentionally generating an offset current If in each phase current. It is to be noted that offset current If may be positive or negative.

Occurrence of such an offset leads to generation of a non-rotating magnetic field relying on offset current If in the stator of motor generator MG. This non-rotating magnetic field acts as constant deceleration torque with respect to the rotor rotational force. The deceleration torque generated by such an offset current will be hereinafter also referred to as "dragging torque". Furthermore, since occurrence of offset current If leads to an increase in the rotor eddy current, the power amount generated by motor generator MG is not increased by occurrence of this dragging torque.

In this way, in electrically powered vehicle 100 according to the present embodiment, when determination flag SOF is turned on during release of the accelerator pedal, a DC current is superimposed on each phase current of motor generator MG, thereby causing dragging torque in motor generator MG.

Figure 5:
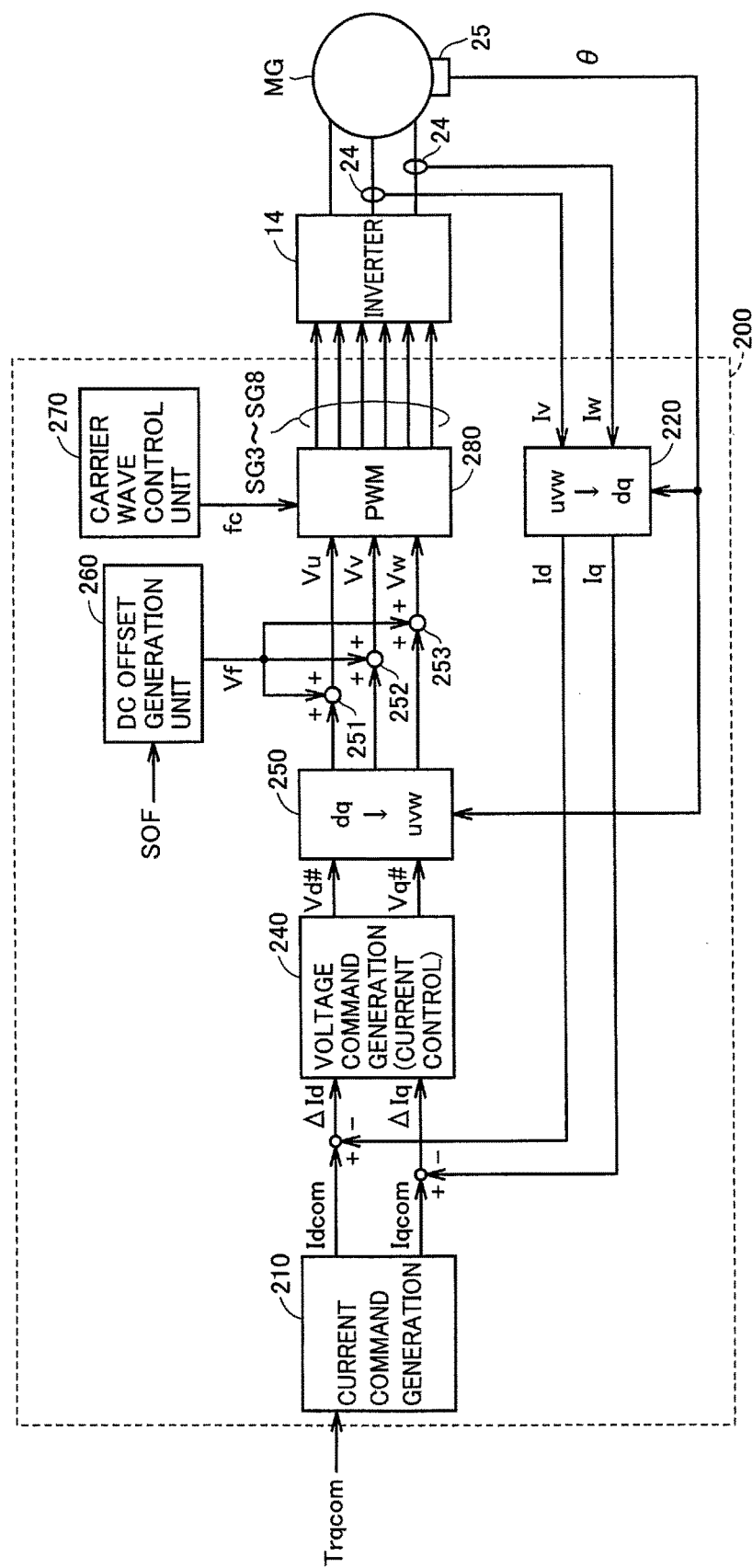
FIG. 5 is a block diagram for illustrating the control configuration of the motor generator in the electrically powered vehicle according to the present first embodiment.

FIG. 5 shows the control configuration of the motor generator in the electrically powered vehicle according to the present embodiment. FIG. 5 also shows the configuration of pulse-width modulation (PWM) control as a representative control configuration.

Referring to FIG. 5, MG-ECU 35 includes a PWM control unit 200 for controlling the output torque of motor generator MG.

PWM control unit 200 includes a current command generation unit 210, a coordinate conversion units 220 and 250, a voltage command generation unit 240, addition units 251 to 253, a PWM modulation unit 280, and a carrier wave control unit 270.

Based on the table and the like prepared in advance, current command generation unit 210 generates a d-axis current command value Idcom and a q-axis current command value Iqcom in accordance with torque command value Trqcom of motor generator MG.

Coordinate conversion unit 220 samples the detection value by current sensor 24, thereby obtaining a motor current of each phase. Furthermore, coordinate conversion unit 220 performs coordinate conversion (three-phase to two-phase) of the obtained three-phase current (Iu, Iv, Iw) using rotation angle θ detected by rotation angle sensor 25, thereby calculating a d-axis current Id and a q-axis current Iq.

Voltage command generation unit 240 receives inputs of a deviation ΔId (ΔId=Idcom−Id) with respect to the command value of the d-axis current and a deviation ΔIq (ΔIq=Iqcom−Iq) with respect to the command value of the q-axis current. Voltage command generation unit 240 performs the PI (proportional integral) operation by a prescribed gain for each of d-axis current deviation ΔId and q-axis current deviation ΔIq to obtain a control deviation, thereby generating a d-axis voltage command value Vd# and a q-axis voltage command value Vq# in accordance with this control deviation.

Coordinate conversion unit 250 performs coordinate conversion (two-phase to three-phase) using rotation angle θ of motor generator MG, thereby converting d-axis voltage command value Vd# and q-axis voltage command value Vq# into U-phase, V-phase and W-phase voltage commands. Each phase voltage command at this stage is applied at a sinusoidal voltage which does not include an offset. In this way, current command generation unit 210, coordinate conversion units 220 and 250, and voltage command generation unit 240 constitute a "control command generation unit".

When determination flag SOF is turned on by determination unit 52 (FIG. 3), DC offset generation unit 260 sets an offset voltage Vf at a prescribed value (|Vf|>0). On the other hand, when determination flag SOF is turned off, DC offset generation unit 260 provides setting such that offset voltage Vf=0.

Addition units 251 to 253 add each phase voltage command converted by coordinate conversion unit 250 and offset voltage Vf set by DC offset generation unit 260. In accordance with the addition results by addition units 251 to 253, voltage commands Vu, Vv and Vw of each phase are set.

Thus, an offset component (Vf) is superimposed on voltage commands Vu, Vv and Vw of each phase, thereby allowing generation of offset current If (FIG. 4) in each phase current of motor generator MG.

Carrier wave control unit 270 sets a carrier frequency fc. For example, carrier frequency fc has an electromagnetic noise that is hard to be sensed by the user. Also, this carrier frequency fc is set at a prescribed frequency so as to prevent significant switching loss in inverter 14.

PWM modulation unit 280 generates switching control signals SG3 to SG8 of inverter 14 in accordance with voltage comparison between the carrier wave having carrier frequency fc set by carrier wave control unit 270 and voltage commands Vu, Vv and Vw of each phase from coordinate conversion unit 250. Examples of the carrier wave may be generally a triangular wave and a sawtooth wave.

The upper and lower arm element of each phase in inverter 14 is controlled to be turned on/off in accordance with switching control signals SG3 to SG8, so that the pseudo-sinusoidal voltage consisting of collection of pulse voltages each having a pulse width modulated is applied to each phase of motor generator MG.

In addition, the amplitude of the carrier wave in PWM modulation corresponds to a voltage on the DC side (system voltage VH) in inverter 14. When the amplitudes of phase voltage commands Vu, Vv and Vw are converted into the value obtained by dividing the original amplitude value based on Vd# and Vq# by system voltage VH, the amplitude of the carrier wave used in PWM modulation unit 280 can be fixed.

According to such a control configuration, the output torque of motor generator MG can be controlled in accordance with torque command value Trqcom by feedback control of the motor current while the offset current for causing dragging torque can be generated in each phase current of motor generator MG when determination flag SOF is turned on. On the other hand, when determination flag SOF is turned on, motor generator MG is controlled so as not to generate an offset current.

Figure 6:
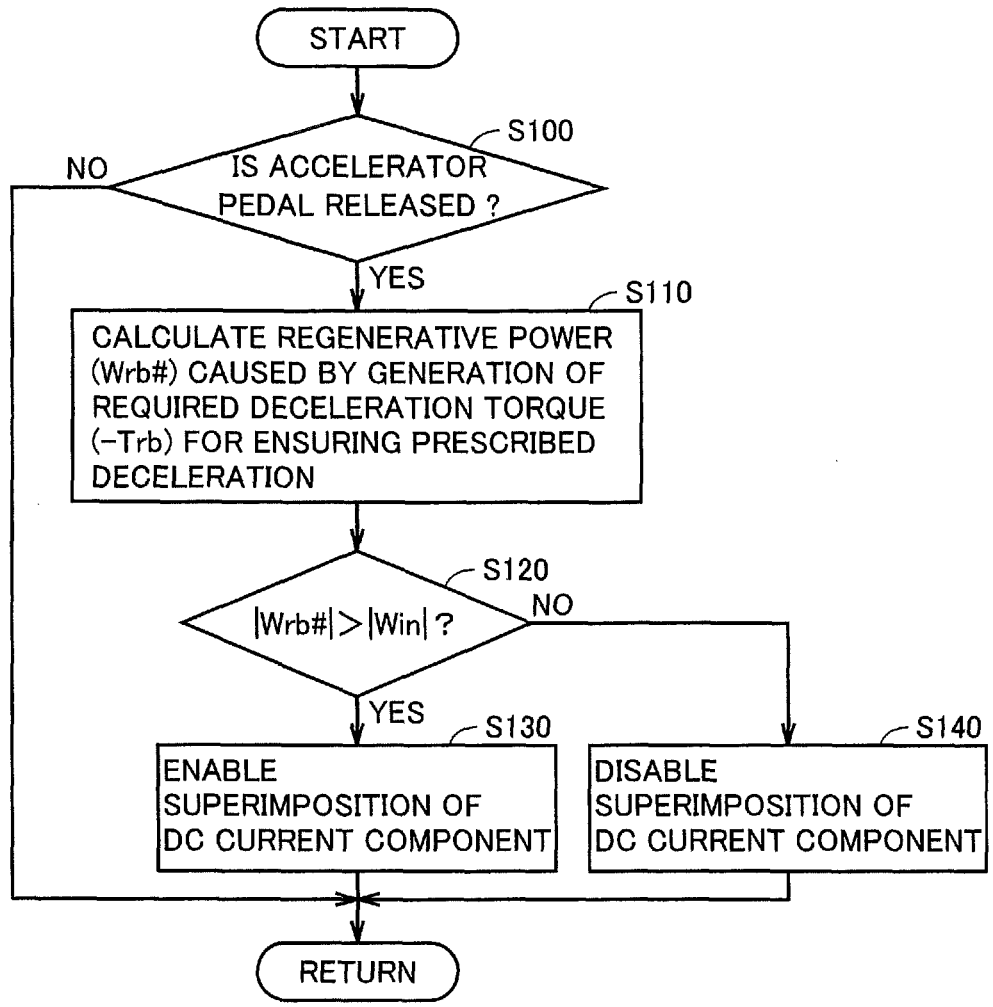
FIG. 6 is a flowchart illustrating the control processing procedure of deceleration control during release of the accelerator pedal in the electrically powered vehicle according to the first embodiment of the present invention.

FIG. 6 shows the control processing procedure of deceleration control during release of the accelerator pedal, in the electrically powered vehicle according to the embodiment of the present invention. Each step of the following flowchart including FIG. 6 is basically implemented by software processing by control device 30 (ECU), but may also be implemented by hardware processing by an electronic circuit provided within the ECU.

Referring to FIG. 6, in step S100, control device 30 determines based on accelerator pedal operation amount AC whether or not accelerator pedal 51 is released. When accelerator pedal 51 is depressed, subsequent steps S110 to S130 for controlling the deceleration during release of the accelerator pedal are skipped.

When the accelerator pedal is released (determined as YES in S100), in step S110, control device 30 sets deceleration torque −Trb required for ensuring prescribed deceleration (equivalent to engine braking). Furthermore, calculated in step S110 is regenerative power Wrb# caused when motor generator MG generates this deceleration torque −Trb (Wrb#<0).

Then, in step S120, control device 30 compares regenerative power Wrb# calculated in step S110 with charge power upper limit value Win based on the present SOC. Then, when regenerative power Wrb# exceeds charge power upper limit value Win (|Wrb#|>|Win|), that is, when charging of battery B is limited/inhibited for ensuring the deceleration torque during release of the accelerator pedal (determined as YES in S120), control device 30 proceeds the process to step S130. In step S130, control device 30 turns determination flag SOF on in order to enable superimposition of the DC current component.

On the other hand, when regenerative power Wrb# falls within the range of charge power upper limit value Win (|Wrb#|≤|Win|) (determined as No in Step 120), control device 30 proceeds the process to step S140, to turn determination flag SOF off in order to disable superimposition of the DC current component.

Consequently, when determination flag SOF is turned on, the AC current having offset current If superimposed thereon as shown in FIG. 4 is caused to flow through each phase of motor generator MG. On the other hand, when charge power upper limit value Win of battery B has a sufficient margin (when determination flag SOF is turned off), inverter 14 is controlled to cause the AC current containing no offset component (If =0) to flow through each phase of motor generator MG.

It is to be noted that determination in step S120 about superimposition of the DC current may be simply made based only on the SOC. Alternatively, superimposition of the DC current component may be enabled only when charging of battery B is inhibited (Win=0 or Trqcom=0).

In this way, according to the electrically powered vehicle and the method of controlling the same in accordance with the first embodiment of the present invention, a DC current is superimposed on each phase current in accordance with the state of charge of battery B during release of the accelerator pedal, thereby allowing generation of dragging torque in motor generator MG. Consequently, also when charging of battery B is limited/inhibited for ensuring deceleration torque during release of the accelerator pedal, the deceleration of electrically powered vehicle 100 can be ensured by generation of the dragging torque, without causing power consumption in motor generator MG. In other words, motor generator MG can be appropriately controlled such that the deceleration can be automatically ensured during release of the accelerator pedal while preventing overcharge of battery B (power storage device).

Particularly, as compared with the case where copper loss of motor generator MG is caused by generation of a d-axis current as in PTL 1, it is advantageous in that power consumption can be reliably caused without depending on the detection accuracy of rotation angle sensor 25. Since the coil winding resistance of motor generator MG is relatively low, there is a limitation in increasing power consumption by copper loss. However, by generating dragging torque by intentionally generating an offset current, it becomes possible to more effectively generate deceleration torque while suppressing regenerative power.

[Second Embodiment]

In the second embodiment, an explanation will be given with regard to the preferable setting of offset current If (FIG. 4) for generating dragging torque in the electrically powered vehicle shown in the first embodiment. In other words, since the configuration and basic control of electrically powered vehicle 100 are the same as those in the first embodiment, components common to those in the first embodiment will not be hereinafter repeated.

Figure 7:
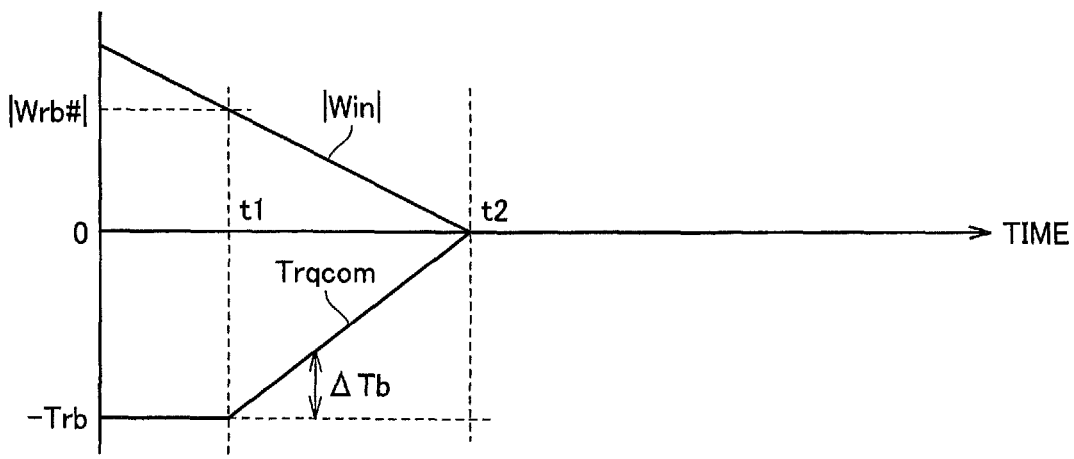
FIG. 7 is a graph illustrating setting of a torque command value associated with limitation on battery charging during release of the accelerator pedal of the electrically powered vehicle.

As in FIG. 2, it is assumed also in FIG. 7 that a vehicle continuously runs on a downhill road for a long distance. Referring to FIG. 7, as described also in FIG. 2, regenerative power Wrb# for generating deceleration torque −Trb for ensuring the prescribed deceleration is to exceed charge power upper limit value Win at time t1. In other words, charging of battery B is limited for ensuring the deceleration torque during release of the accelerator pedal.

Accordingly, at time t1 or later, torque command value Trqcom is limited and set such that −Trb<Trqcom<0. This results in generation of insufficient torque ΔTb with respect to deceleration torque −Trb for ensuring the prescribed deceleration.

Figure 8:
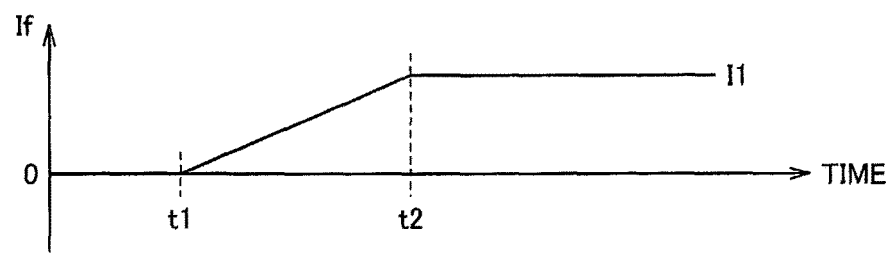
FIG. 8 is a graph illustrating setting of an offset current in deceleration control during release of the accelerator pedal in the electrically powered vehicle according to the second embodiment of the present invention.

FIG. 8 is a graph illustrating setting of the offset current in deceleration control during release of the accelerator pedal in the electrically powered vehicle according to the second embodiment of the present invention.

Referring to FIG. 8, setting can be made such that Trqcom=−Trb until time t1, and thus, insufficient torque ΔTb=0. Accordingly, the torque of motor generator MG is controlled without generating an offset current (If =0).

From time t1, offset current If is set in accordance with insufficient torque ΔTb with respect to deceleration torque −Trb, in which case insufficient torque ΔTb occurs due to limitation on charging of battery B for ensuring the deceleration torque during release of the accelerator pedal. Therefore, as shown in FIG. 7, at time t1 or later, offset current If is also set to be increased in accordance with an increase in insufficient torque ΔTb.

In this way, the deceleration torque of motor generator MG can be ensured at the same level before and after time t1 at which charging limitation on battery B is started. Consequently, the deceleration during release of the accelerator pedal can be ensured, so that the drivability of electrically powered vehicle 100 can be improved.

Then, charging of battery B is inhibited (Win=0), which leads to setting such that offset current If =I1 at time t2 or later at which torque command value Trqcom=0.

It is preferable that the dragging torque caused when offset current If =I1 is equivalent to a prescribed deceleration torque −Trb. However, as described below, generation of an offset current may also result in an operational disadvantage of motor generator MG. Accordingly, the magnitude of a current I1 can be designed as appropriate.

It is confirmatively described that, even when the deceleration ensured by utilizing the dragging torque is insufficient with respect to the so-called engine braking, the hydraulic brake is operated in response to the user's brake operation, thereby allowing the deceleration itself of electrically powered vehicle 100 to be ensured with reliability.

Figure 9:
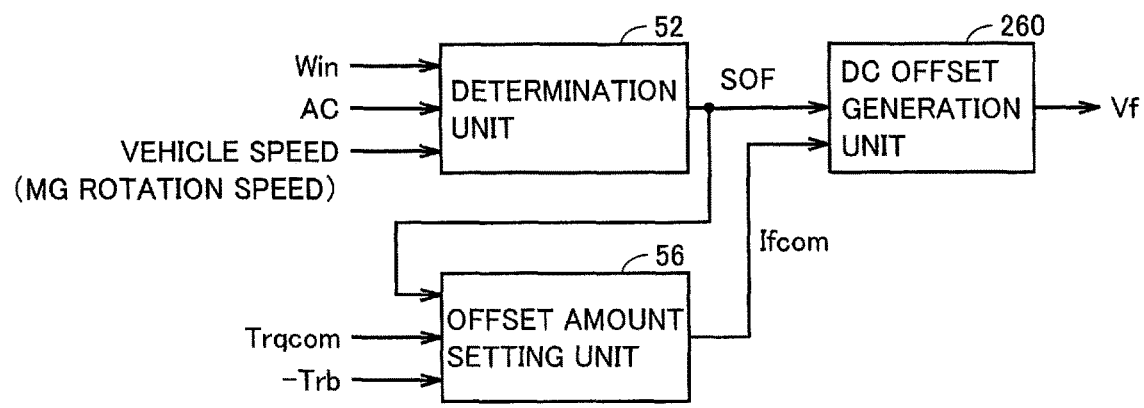
FIG. 9 is a block diagram for illustrating deceleration control during release of the accelerator pedal in the electrically powered vehicle according to the second embodiment of the present invention.

FIG. 9 shows the control configuration of deceleration control during release of the accelerator pedal in the electrically powered vehicle according to the second embodiment of the present invention.

Referring to FIG. 9, determination unit 52 controls determination flag SOF to be turned on/off in the same manner as that shown in FIG. 3. Then, an offset amount setting unit 56 receives torque command value Trqcom, deceleration torque −Trb for ensuring prescribed deceleration, and determination flag SOF. As described above, torque command value Trqcom is set by torque command value setting unit 54 to fall within the range of charge power upper limit value Win.

When determination flag SOF is turned on, offset amount setting unit 56 generates a command value Ifcom of offset current If in accordance with insufficient torque ΔTb of torque command value Trqcom with respect to deceleration torque −Trb (|Ifcom|>0). On the other hand, when determination flag SOF is turned off, offset amount setting unit 56 sets the command value such that Ifcom=0.

Offset current command value Ifcom is input into DC offset generation unit 260 together with determination flag SOF.

When determination flag SOF is turned on, DC offset generation unit 260 sets offset voltage Vf in accordance with offset current command value Ifcom. On the other hand, when determination flag SOF is turned off, offset current command value Ifcom=0 as described above, which leads to Vf=0.

Figure 10:
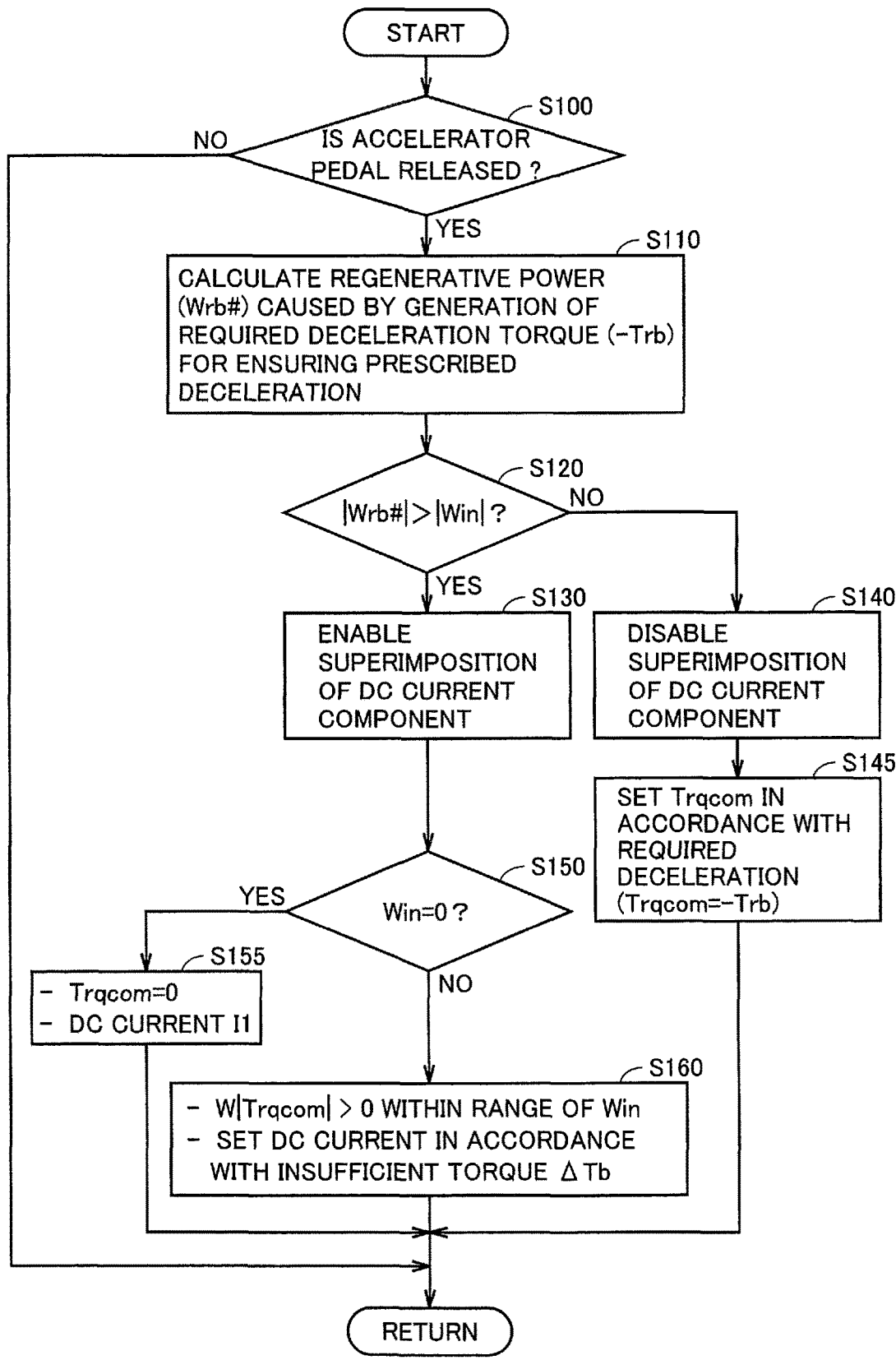
FIG. 10 is a flowchart illustrating the control processing procedure in deceleration control during release of the accelerator pedal in the electrically powered vehicle according to the second embodiment of the present invention.

FIG. 10 shows the control processing procedure of deceleration control during release of the accelerator pedal in the electrically powered vehicle according to the second embodiment, to which variable setting of the offset current is added as shown in FIGS. 7 to 9.

Referring to FIG. 10, when accelerator pedal 51 is released (determined as NO in S100), control device 30 carries out steps S110 to S140 similar to those in FIG. 6.

Then, when required deceleration torque −Trb can be generated within the range of charge power upper limit value Win (determined as NO in S120), control device 30 carries out step S140, and additionally, step S145 to set torque command value Trqcom in accordance with the required deceleration, that is, Trqcom=−Trb.

On the other hand, when it is determined as YES in step S120, that is, when charging of battery B is limited/inhibited for ensuring deceleration torque during release of the accelerator pedal, deceleration torque −Trb calculated in step S110 is set as torque command value Trqcom without any change, with the result that the regenerative power is to exceed charge power upper limit value Win.

Accordingly, control device 30 turns determination flag SOF on for enabling superimposition of the DC current component (step S130), and then, proceeds the process to step S150 to determine whether or not Win=0, that is, whether or not charging of battery B is inhibited.

When Win=0 (determined as YES in S150), control device 30 provides setting in step S155 such that torque command value Trqcom=0, so as to prevent generation of regenerative power. Furthermore, offset current If superimposed on each phase current of motor generator MG is set at I1.

Consequently, the output torque is controlled to be zero while causing power consumption by an offset current, which makes it possible to reliably prevent generation of regenerative power from motor generator MG. Therefore, overcharge of battery B can be prevented more reliably. Furthermore, motor generator MG causes generation of dragging torque, so that the deceleration of electrically powered vehicle 100 can also be ensured.

On the other hand, in the case where Win<0 (determined as NO in S150), control device 30 proceeds the process to step S160, to control torque distribution so as to ensure required deceleration torque −Trb by the sum of the deceleration torque in accordance with torque control and the dragging torque caused by superimposition of the DC current. Specifically, torque command value Trqcom is set to fall within the range of charge power upper limit value Win (−Trb<Trqcom<0) while offset current If is set in accordance with insufficient torque ΔTrb with respect to deceleration torque −Trb.

In this way, in the electrically powered vehicle according to the second embodiment, when charging of battery B is limited during release of the accelerator pedal for ensuring the deceleration torque equivalent to engine braking, motor generator MG can be controlled to ensure the prescribed deceleration during release of the accelerator pedal by the sum of the deceleration torque caused by normal torque control and the dragging torque caused by generation of the offset current. Accordingly, also when charging of power storage device (battery) B is limited, the prescribed deceleration can be ensured during release of the accelerator pedal, to improve the drivability of electrically powered vehicle 100.

Furthermore, when charging of battery B is inhibited, setting is made such that torque command value Trqcom=0 while generation of the dragging torque can causes power consumption in motor generator MG, so that overcharge of battery B can be prevented with reliability. In addition, for the purpose of giving priority to prevention of overcharge, the dragging torque may be caused by generation of the offset current only when charging of battery B is inhibited.

[Third Embodiment]

In the first and second embodiments, the explanation has been given with regard to the deceleration control by which the dragging torque of motor generator MG is intentionally generated during release of the accelerator pedal of electrically powered vehicle 100 in accordance with the state of charge of battery B.

However, due to generation of the offset current for causing dragging torque, in motor generator MG, iron loss may be increased to raise the magnet temperature, thereby causing demagnetization. Therefore, in the third embodiment, an explanation will be given with regard to the control configuration for improving the protection performance of motor generator MG for the deceleration control during release of the accelerator pedal as described in the first and second embodiments.

In other words, the third embodiment also provides the configuration and the basic control configuration of electrically powered vehicle 100 that are similar to those in the first and second embodiments. Therefore, it is confirmatively described that the third embodiment will be explained only for differences from those in the first and second embodiments, and has a configuration similar to those in the first and second embodiments unless otherwise specified.

Figure 11:
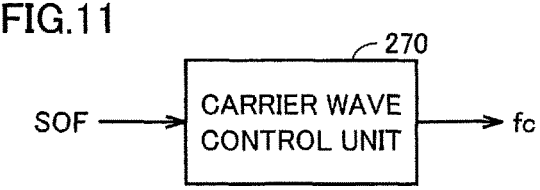
FIG. 11 is a block diagram illustrating the function of a carrier wave control unit in the electrically powered vehicle according to the third embodiment of the present invention.

FIG. 11 is a block diagram illustrating the function of a carrier wave control unit 270 in the electrically powered vehicle according to the third embodiment of the present invention.

Referring to FIG. 11, in the electrically powered vehicle according to the third embodiment, carrier wave control unit 270 shown in FIG. 5 does not set carrier frequency fc at a fixed frequency, but changes this carrier frequency fc in accordance with determination flag SOF.

Figure 12:
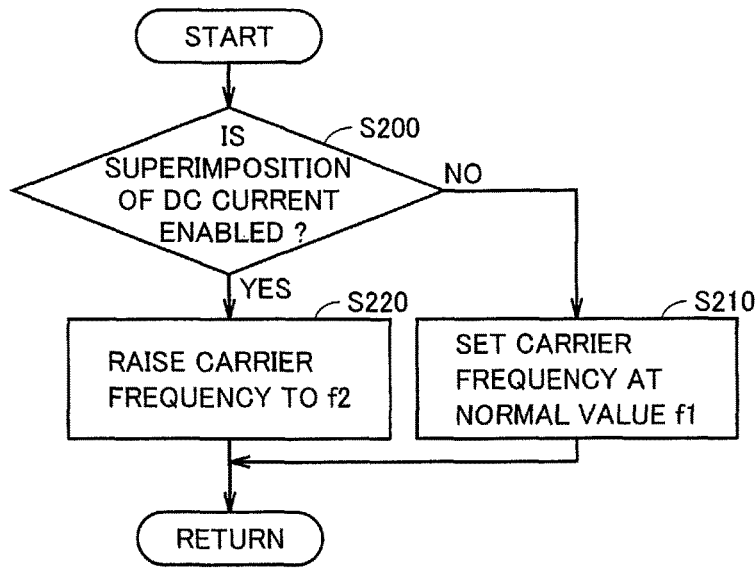
FIG. 12 is a flowchart for illustrating control by the carrier wave control unit shown in FIG. 11.

FIG. 12 is a flowchart for illustrating control by carrier wave control unit 270 shown in FIG. 11.

Referring to FIG. 12, in step S200, carrier wave control unit 270 determines based on determination flag SOF whether or not generation of the offset current by superimposition of the DC current is enabled. Then, when the DC current is not superimposed (determined as NO in step S200), carrier frequency fc is set at a normal value f1 in step S210.

As described above, there are concerns that carrier frequency fc is raised, which may cause an increase in switching loss while carrier frequency fc is lowered, which may cause electromagnetic noise. Therefore, in consideration of the trade-off relationship as described above, normal value f1 is set at a value appropriate during normal driving of the vehicle.

On the other hand, when superimposition of the DC current is enabled (determined as YES in S200), carrier wave control unit 270 raises carrier frequency fc to f2 in step S220 (f2>f1).

Figure 13:
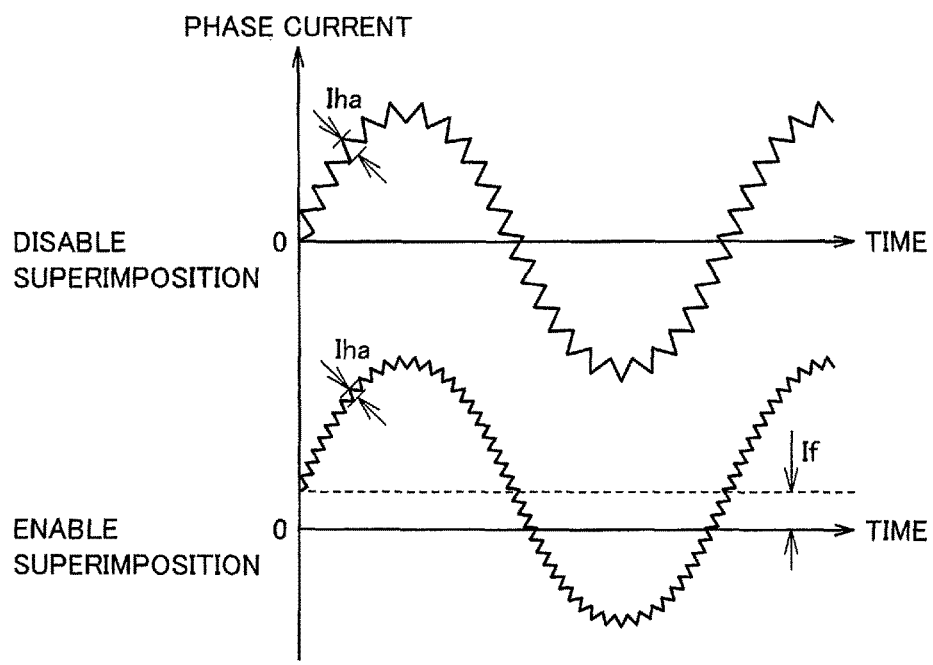
FIG. 13 is a conceptual diagram illustrating a change in the current of each phase in the motor generator caused by carrier wave control shown in FIG. 12.

FIG. 13 shows a change in the current of each phase in motor generator MG in accordance with control of the carrier frequency shown in FIG. 12.

Referring to FIG. 13, when superimposition of the DC current is disabled, the output voltage from inverter 14 to motor generator MG is controlled in accordance with PWM control by the normal carrier frequency (f1). In this case, since inverter 14 is controlled so as not to generate an offset current, the current of each phase in motor generator MG is shaped in a positive/negative symmetrical waveform such that offset current If =0. The fundamental frequency of the phase current corresponds to a rotational frequency of motor generator MG. The phase current is shaped such that a high-frequency component equivalent to a ripple current resulting from the switching frequency in inverter 14, that is, carrier frequency fc=f1, is superimposed on this fundamental wave component.

On the other hand, when superimposition of the DC current is enabled, offset voltage Vf is superimposed on each phase voltage command by DC offset generation unit 260 shown in FIG. 5. Consequently, an offset current If (|If|=Ifcom) is generated in the phase current, and its waveform is positively and negatively asymmetrical in shape. Furthermore, carrier frequency fc is raised to f2, which leads to a decrease in the amplitude of the ripple current (high frequency component) superimposed on the fundamental wave component.

In this case, it is known that the iron loss occurring in motor generator MG is dependent on both of the offset component and the magnitude of the ripple of a high frequency component superimposed on the fundamental wave component. Accordingly, when the DC current is superimposed during which an offset current is generated, the amplitude of the high frequency component is suppressed, thereby allowing suppression of an increase in iron loss, that is, an increase in magnet temperature in motor generator MG.

Consequently, as compared with the case where the carrier frequency is fixed, it becomes possible to prevent temperature rise in motor generator MG (occurrence of demagnetization) during occurrence of dragging torque for controlling the deceleration.

[Modification of Third Embodiment]

In the modification of the third embodiment, the magnitude of the offset current or the superimposition time period thereof is variably set in accordance with the state of demagnetization of motor generator MG at the time when superimposition of the DC current is enabled.

Figure 14:
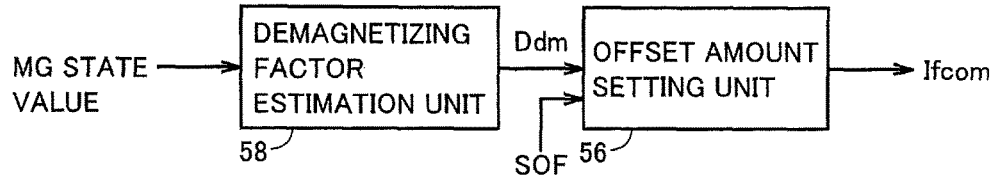
FIG. 14 is a block diagram for illustrating deceleration control during release of the accelerator pedal in the electrically powered vehicle according to a modification of the third embodiment of the present invention.

Referring to FIG. 14, the electrically powered vehicle according to the modification of the third embodiment is further provided with a demagnetizing factor estimation unit 58. Demagnetizing factor estimation unit 58 estimates the demagnetizing factor of motor generator MG based on the state value of motor generator MG. Offset amount setting unit 56 sets command value Ifcom of the offset current based on a demagnetizing factor estimate value Ddm obtained by demagnetizing factor estimation unit 58.

As described in the second embodiment, the magnitude of offset voltage Vf obtained by DC offset generation unit 260 (FIG. 5) is controlled based on command value Ifcom set by the offset amount setting unit. Accordingly, offset current If is set in accordance with command value Ifcom.

When the magnet temperature of motor generator MG can be obtained, demagnetizing factor estimation unit 58 can calculate demagnetizing factor estimate value Ddm in accordance with the obtained magnet temperature. Since it is generally difficult to measure the temperature of the permanent magnet attached to the rotor, the magnet temperature is estimated based on the state value of motor generator MG, the temperature of the cooling oil, and the like.

Alternatively, based on the voltage equation of motor generator MG, demagnetizing factor estimation unit 58 can also calculate demagnetizing factor estimate value Ddm, as described below.

It is known that the q-axis voltage equation used when controlling a permanent magnet motor (motor generator MG) with d-q axis conversion is represented by the following equation (1).

$$Vq = \omega L_d I_d + R I_q + \omega \phi \quad (1)$$

In this case, $\omega$: rotation angle speed, $\phi$: armature flux linkage by a permanent magnet, Ld: q-axis inductance, and R: armature resistance.

Accordingly, q-axis voltage command value Vq# set by feedback control by PWM control unit 200, the present d-axis current Id and q-axis current Iq, and the present rotation angle speed ω of motor generator MG are substituted into the equation (1), so that the present estimate value φ1 of the armature flux linkage can be calculated.

Then, by calculating, in advance, an armature flux linkage φm at the time when demagnetization does not occur (the room temperature state of the permanent magnet), demagnetizing factor estimate value Ddm can be calculated by the following equation (2) using estimate value φ1.

$$Ddm = = (\phi m - \phi 1)/\phi m \quad (2)$$

In this way, demagnetizing factor estimation unit 58 can estimates to calculate the demagnetizing factor based on the q-axis voltage command value used when motor generator MG is controlled with d-q axis conversion. In the present embodiment, the method of calculating demagnetizing factor estimate value Ddm is not in particularly limited.

Figure 15:
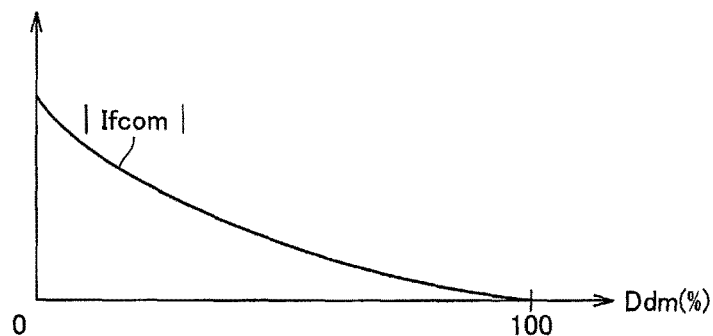
FIG. 15 is a conceptual diagram illustrating variable setting of an offset current.

Offset amount setting unit 56 variably sets command value Ifcom of the offset current in accordance with demagnetizing factor estimate value Ddm, for example, depending on the characteristics shown in FIG. 15.

Referring to FIG. 15, offset amount setting unit 56 generates dragging torque such that the greater the demagnetizing factor estimate value Ddm is, the smaller the offset current command value |Ifcom| is. Thus, when demagnetization progresses, the current amount of the offset current is suppressed, so that further progress of demagnetization can be prevented.

Furthermore, the time period during which the offset current is superimposed can also be variably set in accordance with demagnetizing factor estimate value Ddm.

Figure 16:
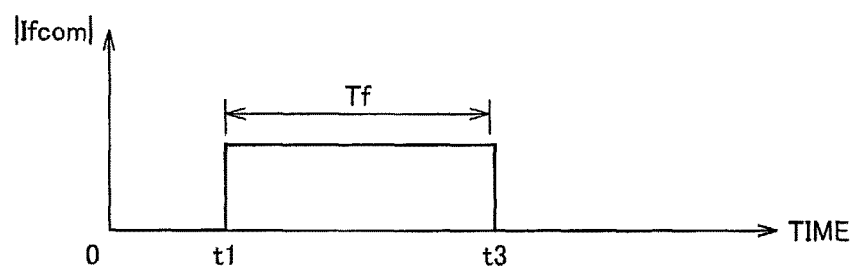
FIG. 16 is a conceptual diagram illustrating the definition of a superimposition time period of the offset current.

Referring to FIG. 16, superimposition of the DC current is enabled from time t1, to set command value Ifcom of the offset current such that |Ifcom|>0. In this case, generation of the offset current is limited to the time period from time t1 at which superimposition is started to time t3 at which a superimposition time period Tf has elapsed. In other words, at time t3 or later, offset amount setting unit 56 returns the setting to offset current command value Ifcom=0, with the result that the offset current is assumed not to occur.

Figure 17:
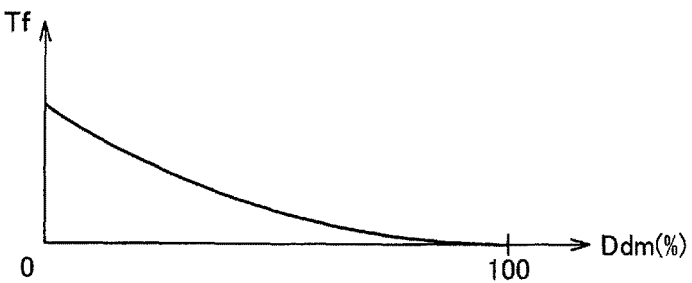
FIG. 17 is a conceptual diagram illustrating variable setting of the superimposition time period of the offset current.

Offset amount setting unit 56 variably sets superimposition time period Tf of the offset current in accordance with demagnetizing factor estimate value Ddm, for example, depending on the characteristics shown in FIG. 17.

Referring to FIG. 17, offset amount setting unit 56 limits superimposition time period Tf to be reduced in accordance with an increase in demagnetizing factor estimate value Ddm, to generate dragging torque. Consequently, when demagnetization progresses, the time period of generating the offset current is reduced, so that further progress of demagnetization can be prevented.

Figure 18:
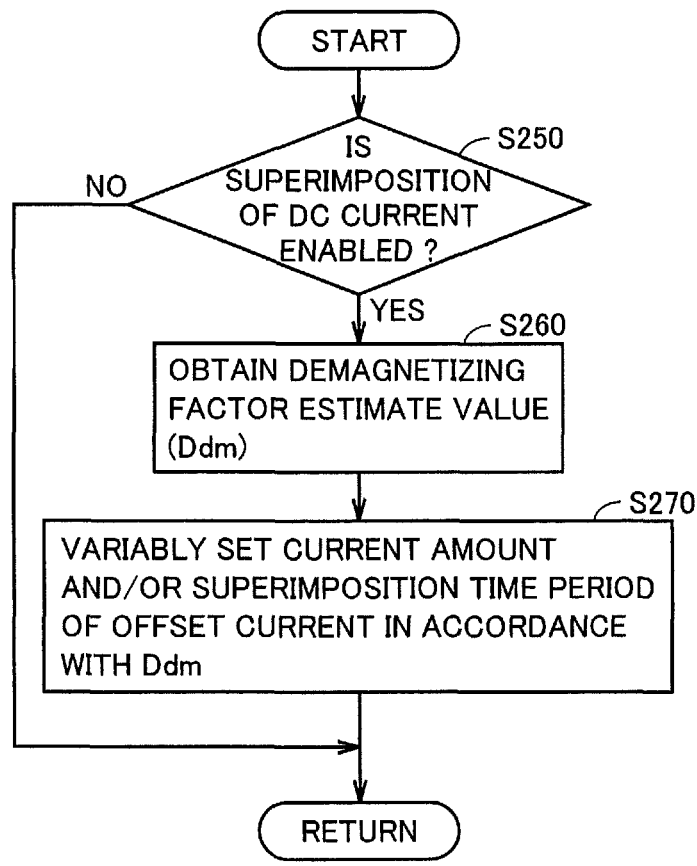
FIG. 18 is a flowchart for illustrating the control processing procedure in deceleration control during release of the accelerator pedal in the electrically powered vehicle according to the modification of the third embodiment of the present invention.

FIG. 18 is a flowchart for illustrating the control processing procedure of deceleration control during release of the accelerator pedal in the electrically powered vehicle according to the modification of the third embodiment of the present invention.

Referring to FIG. 18, in steps S250, control device 30 determines based on determination flag SOF whether or not generation of the offset current by superimposition of the DC current is enabled. Then, when the DC current is superimposed (determined as YES in S250), control device 30 calculates demagnetizing factor estimate value Ddm of motor generator MG in step S260.

In step S270, in accordance with demagnetizing factor estimate value Ddm, control device 30 variably sets the amount and/or the superimposition time period of the offset current. In other words, offset current command value Ifcom and/or superimposition time period Tf is/are set in accordance with the characteristics shown in FIG. 15 and/or FIG. 17.

As described above, by combining the third embodiment and its modification with deceleration control during release of the accelerator pedal according to the first and second embodiments, the amount and/or the superimposition time period of the offset current is/are variably set during occurrence of dragging torque by the offset current. Consequently, demagnetization of motor generator MG can be prevented.

Although the three-phase electric motor has been illustrated as motor generator MG in the present embodiment, deceleration control according to the present invention is also applicable to every type of AC electric motor other than the three-phase electric motor.

Although FIG. 1 shows, as a preferably configuration example, the configuration in which DC power supply unit 10# includes converter 12 such that the input voltage (system voltage VH) into inverter 14 can be variably controlled, DC power supply unit 10# is not limited to the configuration illustrated in the present embodiment. In other words, the inverter input voltage is not necessarily variably, but the present invention is also applicable to the configuration in which the output voltage of power storage device B is input into inverter 14 without any change (for example, the configuration in which converter 12 is eliminated).

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present invention is applicable to an electrically powered vehicle provided with, as a traction motor, a motor generator configured to be capable of transmitting and receiving motive power to and from a driving shaft coupled to a driving wheel.

REFERENCE SIGNS LIST 5 ground line, 6, 7 power line, 10 monitoring unit, 10# DC power supply unit, 11, 13 voltage sensor, 12 converter, 14 inverter, 15 to 17 upper and lower arm of each phase, 24 current sensor, 25 rotation angle sensor, 30 control device, 35 MG-ECU, 40 battery ECU, 42 SOC estimation unit, 44 charge/discharge limitation setting unit, 50 HV-ECU, 51 accelerator pedal, 52 determination unit, 54 torque command value setting unit, 55 brake pedal, 56 offset amount setting unit, 58 demagnetizing factor estimation unit, 60 driving shaft, 70 differential gear, 80 driving wheel, 100 electrically powered vehicle, 200 control unit, 210 current command generation unit, 220, 250 coordinate conversion unit, 240 voltage command generation unit, 251 to 253 addition unit, 260 DC offset generation unit, 270 carrier wave control unit, 280 modulation unit, AC accelerator pedal operation amount, B battery (power storage device), BK brake operation amount, C0, C1 smoothing capacitor, D1 to D8 antiparallel diode, Ddm demagnetizing factor estimate value, Iu, Iv, Iw motor current (phase current), Ib output current (power storage device), Id d-axis current, Idcom d-axis current command value, If offset current, Ifcom offset current command value, Iq q-axis current, Iqcom q-axis current command value, L1 reactor, MG motor generator, Q1 to Q8 power semiconductor switching element, SE control signal, SG1 to SG8 switching control signal, SOF determination flag (enabling/disabling superimposition of a DC current), SR1, SR2 system relay, Smax control upper limit value, Tb temperature (power storage device), Tf offset current superimposition time period, Trqcom torque command value, VH DC voltage (system voltage), VL DC voltage, VHr voltage command value, Vb output voltage, Vf offset voltage, Vu, Vv, Vw voltage command of each phase, Win charge power upper limit value, Wout discharge power upper limit value, Wrb# regenerative power, fc carrier frequency.

The invention claimed is:

1. An electrically powered vehicle comprising:
a motor generator configured to be capable of transmitting and receiving torque to and from a driving shaft coupled to a driving wheel;
a DC power supply including a power storage device;
an inverter configured to perform bidirectional DC/AC power conversion between said DC power supply and said motor generator;
a motor control unit configured to control a plurality of power semiconductor switching elements forming said inverter in accordance with a torque command value and a state value of said motor generator;
a charge/discharge monitoring unit configured to set a charge power upper limit value of said power storage device based on the state of charge of said power storage device; and
a vehicle control unit configured to set said torque command value based on a vehicle state and said charge power upper limit value set by said charge/discharge monitoring unit,
said motor control unit including a DC offset generation unit programmed to control said inverter to cause said motor generator to output a deceleration torque, by superimposing a DC current component on an AC current of each phase in said motor generator in accordance with a state of charge of said power storage device, during release of an accelerator pedal,
said vehicle control unit including a determination unit configured to determine whether or not a first power exceeds said charge power upper limit value, said first power being equivalent to regenerative power caused by said motor generator outputting deceleration torque required for ensuring prescribed deceleration during release of said accelerator pedal, and when it is determined that said first power exceeds said charge power upper limit value during release of said accelerator pedal, said DC offset generation unit being configured to control said inverter to superimpose said DC current component on said AC current of each phase, said vehicle control unit further including a torque command value setting unit configured to limit the regenerative power by said motor generator so as to fall within a range not exceeding said charge power upper limit value, to set said torque command value, and said DC offset generation unit and said torque command value setting unit being configured to set a current amount of said DC current component and said torque command value, respectively, so as to ensure the required deceleration torque by a sum of dragging torque caused by said DC current component and said torque command value, during release of said accelerator pedal while charging is limited during which said first power exceeds said charge power upper limit value.

2. The electrically powered vehicle according to claim 1, wherein said torque command value setting unit sets said torque command value at zero when charging is inhibited during which said charge power upper limit value is set at zero, and said DC offset generation unit sets the current amount of said DC current component at a prescribed value when said charging is inhibited.

3. The electrically powered vehicle according to claim 1, wherein said vehicle control unit sets said torque command value at zero when charging is inhibited during which said charge power upper limit value is set at zero, and said DC offset generation unit sets a current amount of said DC current component at a prescribed value when said charging is inhibited.

4. The electrically powered vehicle according to claim 1, wherein said motor control unit includes a control command generation unit for generating a voltage command value of a voltage applied to said motor generator based on said torque command value and said state value, an addition unit for adding an offset voltage in accordance with said DC current component to said voltage command value when said DC current component is superimposed by said DC offset generation unit, a carrier wave control unit for controlling a frequency of a carrier wave, and a modulation unit for generating an on/off control signal of each of said plurality of power semiconductor switching elements based on comparison between said voltage command value processed by said addition unit and said carrier wave, and when said DC current component is superimposed, said carrier wave control unit increases the frequency of said carrier wave as compared with a case where said DC current component is not superimposed.

5. The electrically powered vehicle according to claim 1, wherein said motor control unit further includes a demagnetizing factor estimation unit for estimating a demagnetizing factor of said motor generator, and said DC offset generation unit limits a time period during which the DC current component is superimposed on said AC current of each phase in accordance with an estimate value of said demagnetizing factor.

6. The electrically powered vehicle according to claim 1, wherein said motor control unit further includes a demagnetizing factor estimation unit that estimates a demagnetizing factor of said motor generator, and said DC offset generation unit variably sets a current amount of the DC current component superimposed on said AC current of each phase in accordance with an estimate value of said demagnetizing factor.

7. A method of controlling an electrically powered vehicle including a motor generator configured to be capable of transmitting and receiving torque to and from a driving shaft coupled to a driving wheel, a DC power supply including a power storage device, and an inverter for performing bidirectional DC/AC power conversion between said DC power supply and said motor generator, said method comprising:

the step of detecting that an accelerator pedal is released;

the step of calculating a first power equivalent to regenerative power caused by said motor generator outputting deceleration torque required for ensuring prescribed deceleration during release of said accelerator pedal;

the step of comparing said first power with a charge power upper limit value set based on the state of charge of said power storage device, the step of, during release of said accelerator pedal, controlling said inverter to cause said motor generator to output a deceleration torque by superimposing a DC current component on an AC current of each phase in said motor generator when said first power exceeds said charge power upper limit value; and the step of, during release of said accelerator pedal while charging is limited during which said first power exceeds said charge power upper limit value, limiting the regenerative power by said motor generator so as to fall within a range not exceeding said charge power upper limit value, to set a torque command value of said motor generator, and setting a current amount of said DC current component so as to ensure said required deceleration torque by a sum of dragging torque caused by said DC current component and said torque command value.

8. The method of controlling an electrically powered vehicle according to claim 7, further comprising:

the step of, when said first power exceeds said charge power upper limit value, determining whether or not charging is inhibited during which said charge power upper limit value is set at zero;

the step of, when said charging is inhibited, setting a torque command value of said motor generator at zero and setting a current amount of said DC current component at a prescribed value; and the step of, when said charge power upper limit value is not zero, limiting the regenerative power by said motor generator so as to fall within a range not exceeding said charge power upper limit value, to set said torque command value, and setting the current amount of said DC current component so as to ensure said required deceleration torque by a sum of dragging torque caused by said DC current component and said torque command value.

9. The method of controlling an electrically powered vehicle according to claim 7, further comprising the step of setting a torque command value of said motor generator at zero and setting a current amount of said DC current component at a prescribed value, during release of said accelerator pedal while charging is inhibited during which a charge power upper limit value of said power storage device is set at zero.

10. The method of controlling an electrically powered vehicle according to claim 7, wherein
a plurality of power semiconductor switching elements forming said inverter are controlled to be turned on/off in accordance with comparison between a voltage command value of a voltage applied to said motor generator and a carrier wave,
when said DC current component is superimposed in said controlling step, an offset voltage in accordance with said DC current component is added to said voltage command value, and
said controlling method further comprises:
the step of determining whether or not said DC current component is superimposed in said controlling step;
the step of setting a frequency of said carrier wave at a first frequency when said DC current component is not superimposed; and
the step of setting the frequency of said carrier wave at a second frequency higher than said first frequency when said DC current component is superimposed.

11. The method of controlling an electrically powered vehicle according to claim 7, further comprising:
the step of estimating a demagnetizing factor of said motor generator; and
the step of limiting a time period during which said DC current component is superimposed on said AC current of each phase, in accordance with an estimate value of said demagnetizing factor.

12. The method of controlling an electrically powered vehicle according to claim 7, further comprising:
the step of estimating a demagnetizing factor of said motor generator; and
the step of variably setting a magnitude of said DC current component superimposed on said AC current of each phase in accordance with an estimate value of said demagnetizing factor.

* * * * *